March 31, 1959     E. D. GORDON     2,879,854
DISC TILLER
Filed May 5, 1954     6 Sheets-Sheet 1
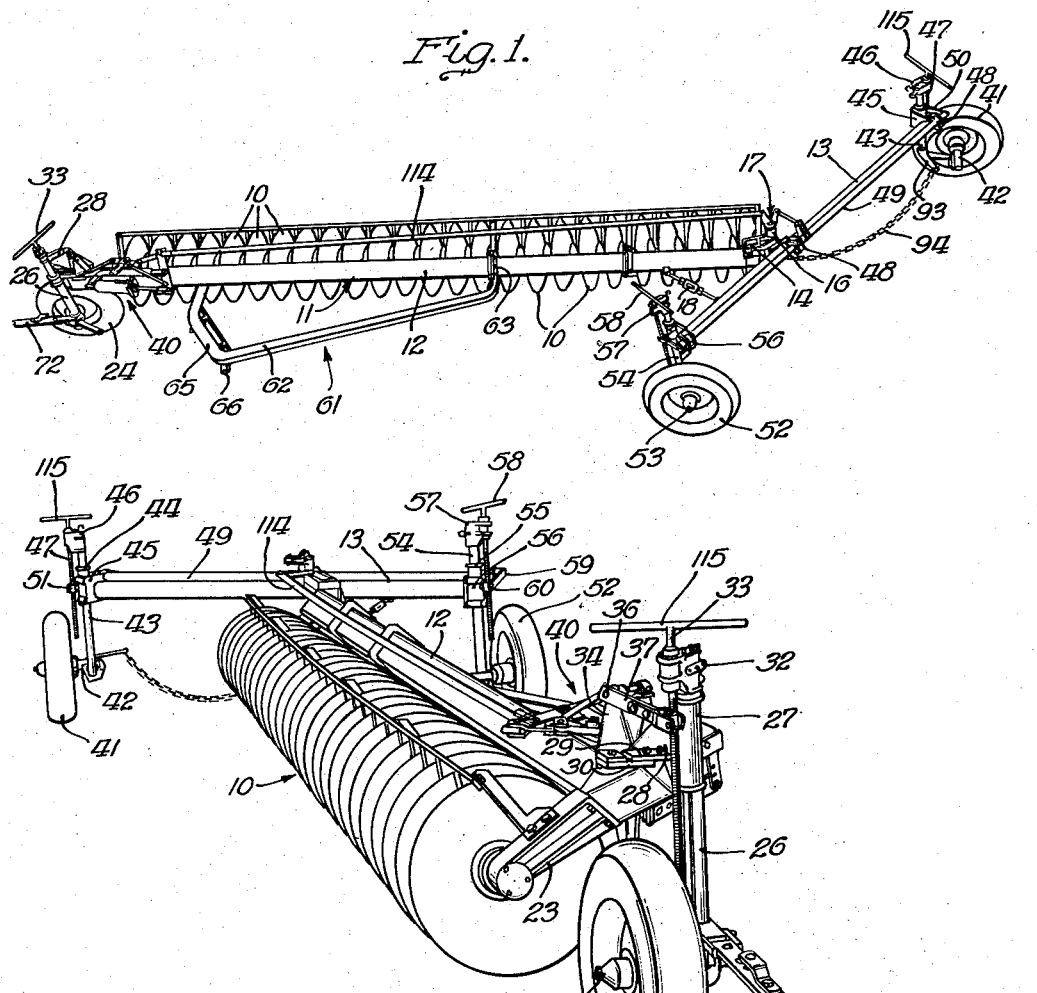
INVENTOR.
Edward D. Gordon
BY
Emerson B Donnell
Atty.

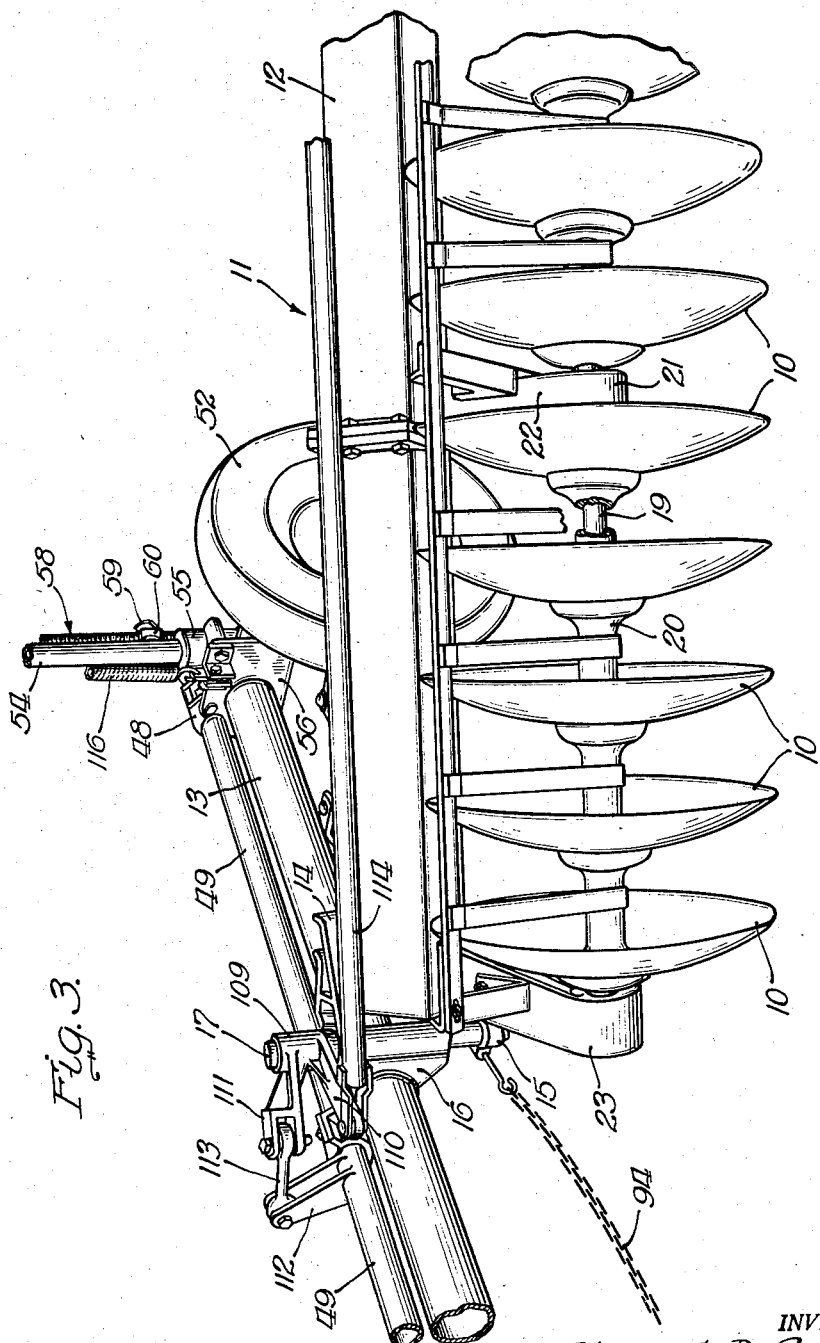

March 31, 1959    E. D. GORDON    2,879,854
DISC TILLER

Filed May 5, 1954    6 Sheets-Sheet 3

INVENTOR.
Edward D. Gordon
BY
Emerson B Donnell
Atty.

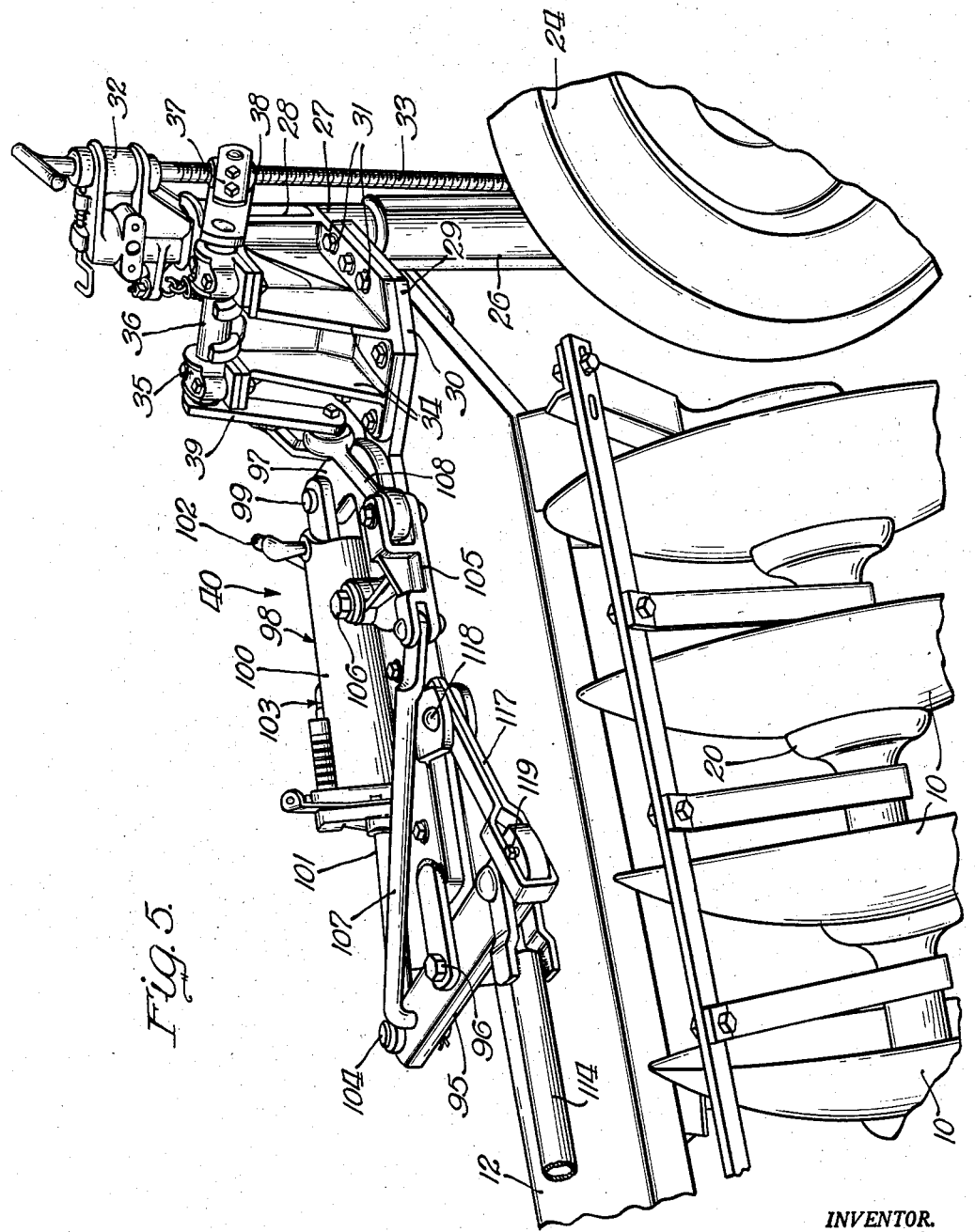

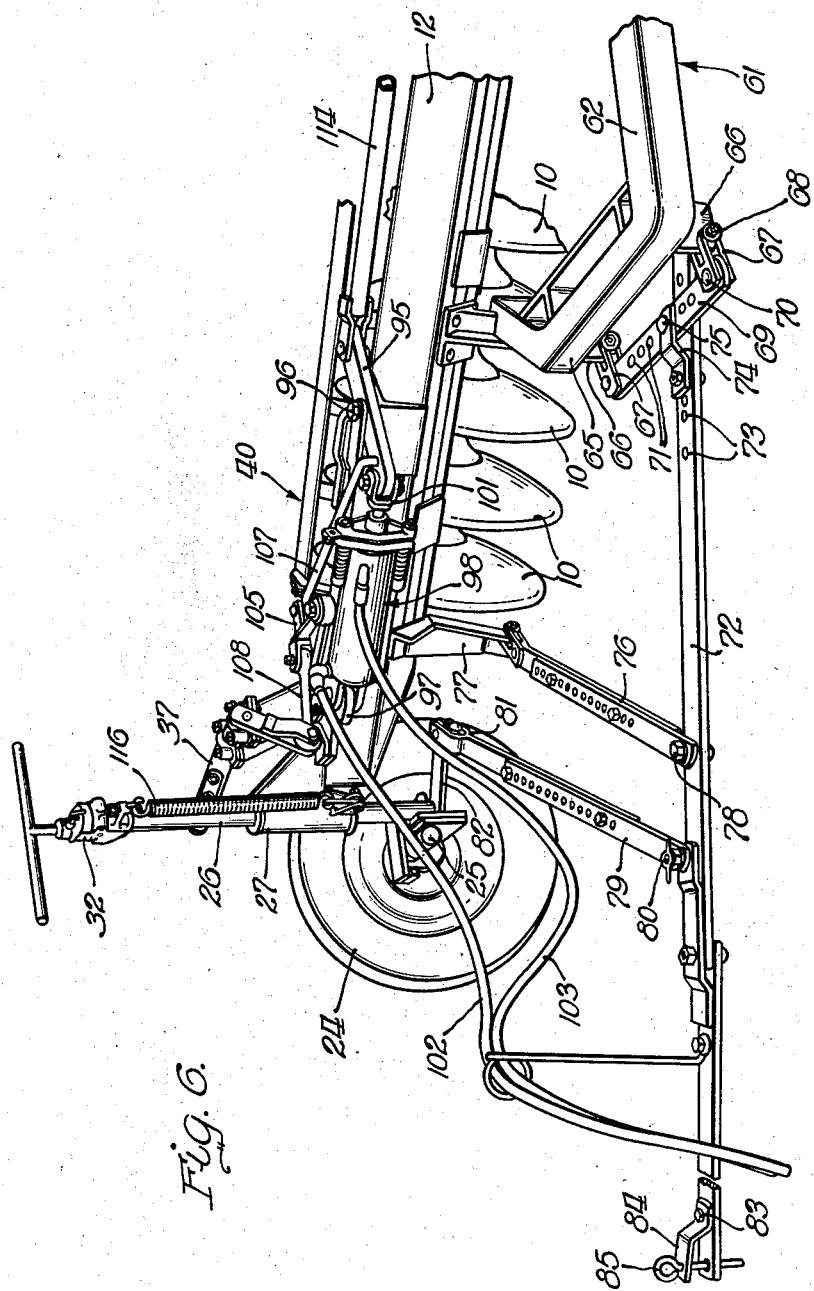

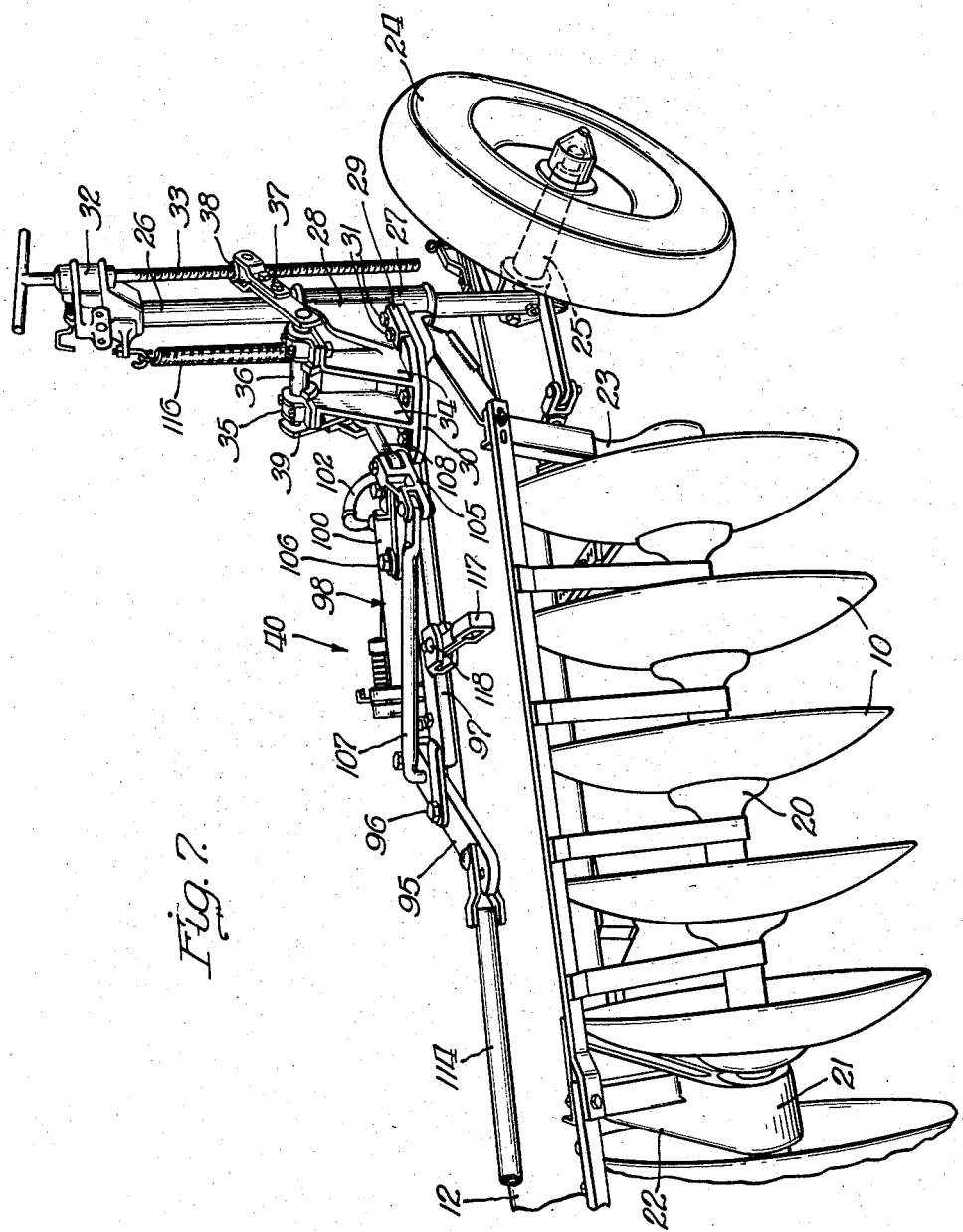

United States Patent Office 2,879,854
Patented Mar. 31, 1959

2,879,854
DISC TILLER

Edward D. Gordon, Rockford, Ill., assignor to J. I. Case Company, Racine, Wis., a corporation of Wisconsin Application May 5, 1954, Serial No. 427,774

2 Claims. (Cl. 172—401)

The present invention relates to agricultural implements and more particularly to a novel disc tiller having an exceptionally large capacity while not being excessively heavy or unwieldy.

An object of the present invention is to provide an implement, such as a disc tiller of the wheel supported type, which permits selective adjustment of the wheels as desired.

A further object of the invention is the provision of power operated means connected with said implement supporting wheels for moving the ground working tools of the implement in unison from an operating position to a transport position.

Still another object of the present invention is the provision whereby the ground working tools can be shifted from a position wherein they are operating deeply within the soil to a position wherein they are elevated just above the surface of the ground and also to a position where they are operated very shallow in the soil and to a position wherein they are moved vertically a substantial distance above the surface of the ground.

A further object is to provide a disc tiller, of the large capacity type, which is relatively simple in design, easy to manufacture, and which performs its function in a highly efficient and economical manner.

Still another object of the present invention is the provision of a manually operated wheel adjusting means associated with each of the wheels and operable independently of the power operated means whereby the ground working tools of the implement can be shifted vertically independently of the power operated means.

Other objects and advantages will become apparent upon reading the following description in conjunction with the accompanying drawings, in which, Fig. 1 is a top perspective view of a disc tiller containing a preferred embodiment of this invention.

Fig. 2 is a front perspective view of the embodiment shown in Fig. 1.

Fig. 3 is an enlarged fragmentary perspective view of the embodiment shown in Fig. 1.

Fig. 5 is an enlarged fragmentary perspective view of the embodiment shown in Fig. 1.

Fig. 6 is an enlarged fragmentary perspective view of the portion shown in Fig. 5 but taken from the side approximately opposite of that of Fig. 5.

Fig. 7 is a fragmentary perspective view of the portion shown in Fig. 5 but with the operating parts in a different position.

Figure 4:
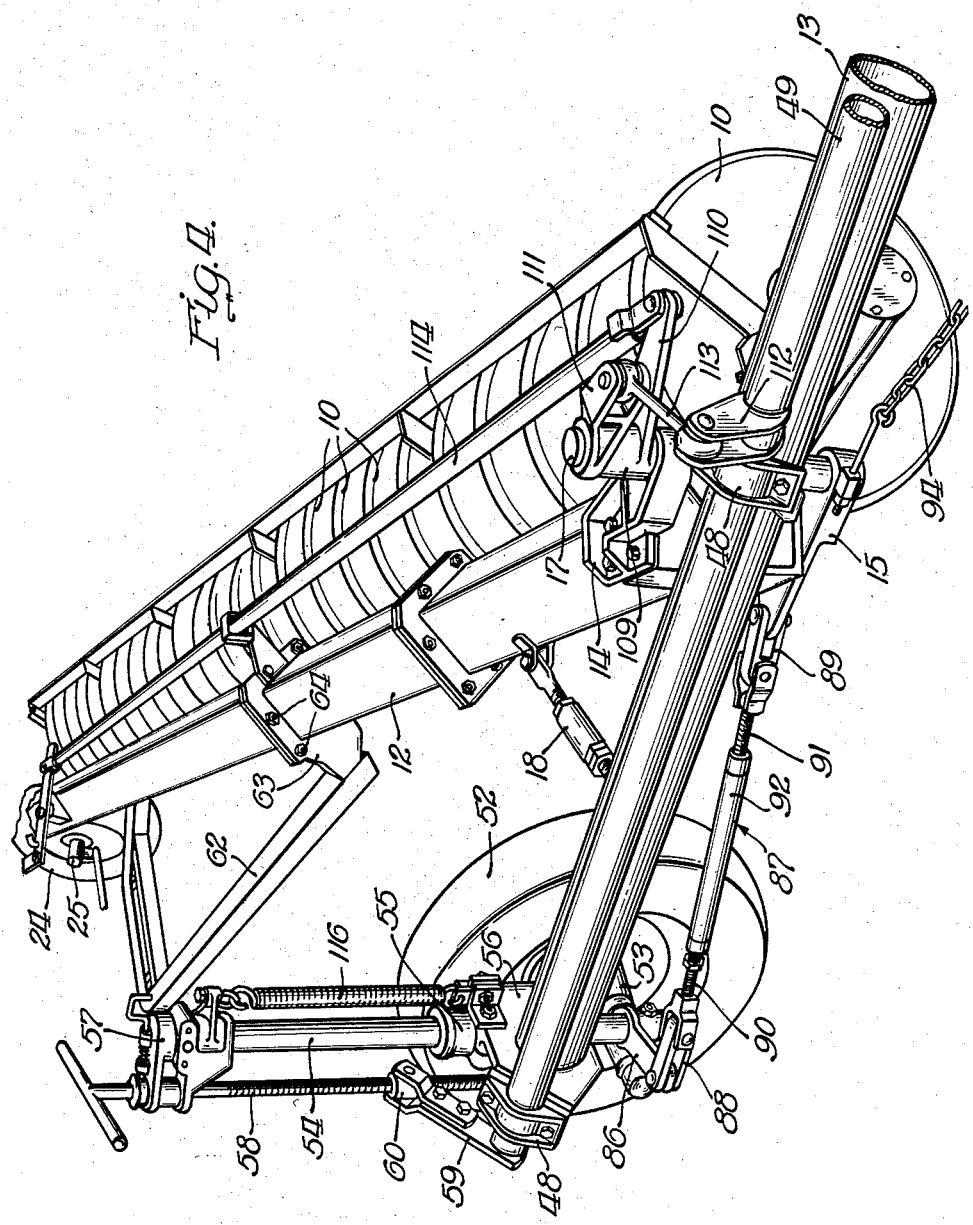
Fig. 4 is an enlarged fragmentary perspective view of the portion shown in Fig. 3 but taken from the side approximately opposite of that of Fig. 3.

Referring to the drawings, the implement, in which the principles of the present invention have been embodied and which is illustrated in the drawings by way of example, is a disc tiller of the large capacity type comprising in the present instance a plurality of discs 10 carried in depending relationship from a horizontally disposed main frame indicated in its entirety by the number 11.

The main frame 11 is made up of an elongated member 12, preferably constructed of rigid sheet metal, and a tubular member 13, preferably formed of round pipe stock forms an auxiliary frame connected obliquely to the member 12. The rearward end of the member 12, as shown in Figs. 3 and 4, has fixed thereto a bifurcated section including an axially extending top bracket 14 and an axially extending bottom bracket 15. Fig. 3 shows that the tubular member 13 has secured thereto a vertically disposed journal bearing 16 and a pivot pin 17 is received in aligned apertures formed in the bracket 15, the journal bearing 16, and in the bracket 14 so as to swingably connect the tubular member 13 to the member 12. The journal bearing 16 is preferably welded to the tubular member 13 at a point substantially adjacent the central or mid-portion thereof so that the tubular member 13 in effect is integral with the member 12. The member 12 is interconnected to the tubular member 13 by means of an adjustable link 18 which is in the form of a turn buckle whereby the operator, by increasing or decreasing the effective length of the link 18, can select and retain the desired angular adjustment between the main frame 12 and the member 13.

It should be understood that the position shown in Fig. 1 is the tiller's transport position as the wheels are directed to have the tiller move to the left as Fig. 1 is viewed. However, in the operating position, the wheels are turned to have the tiller move in the direction of the drawbar shown in Fig. 6 and as hereinafter explained.

As shown in Fig. 3, discs 10 are arranged in gangs and each gang of discs 10 includes a gang bolt 19 and spaced thimbles 20. The discs 10 are supported in co-axial relationship, and the gang bolts 19 are co-axially supported in a suitable bearing 21 formed in the lower end of a disc standard 22. The upper end of standard 22 is welded or otherwise fixed to the member 12. Attached to the opposite ends of the member 12 are downwardly and rearwardly depending standards 23 which also carry suitable bearing means adjacent the lower ends thereof for receiving the end gang bolts therein. It will be appreciated that the details of the disc gangs 10 form no part of the present invention and that any suitable or well-known construction can be used in association with the disc tiller illustrative of this invention.

As shown in Fig. 7, the furrow-ward end of the frame member 12 is defined by a front furrow wheel 24 which is journaled for rotation on a lower horizontally disposed end 25 of a vertically disposed front wheel spindle 26. The spindle 26 is vertically slideably disposed in a sleeve section 27 which is formed as a part of a casting 28 having a horizontally disposed attaching plate 29 formed thereon. The forward end of the member 12 has welded thereto a horizontally disposed plate 30 with the plate 29 of the casting 28 fixed to the plate 30 by bolts or the like 31. A cap member 32 is swingably mounted on the upper end of the spindle 26 and rotatably receives therein a downwardly disposed threaded adjusting member 33 which is rotatably supported in the cap 32 while being prevented from moving axially with respect thereto.

As shown best in Fig. 5, the casting 28 has also attached thereto a pair of upwardly extending standards 34, and a pair of bearings 35 is carried on the upper ends of the standards to rotatably receive a horizontal rock shaft 36. The rock shaft 36 has non-rotatably fixed to one end thereof, as by welding or the like, a forwardly extending rock arm 37 which pivotally carries adjacent its outer end a threaded nut 38. The nut 38 theadedly receives the threaded portion of the adjusting member 33. The other end of the rock shaft 36 has non-rotatably fixed thereto a downwardly disposed rock arm 39 which is connected adjacent its lower end to a power responsive lifting mechanism, generally designated 40, which will be more fully explained hereinafter.

The rear end of the member 13 is supported on a rear furrow wheel 41 and is journaled for rotation on a horizontal portion 42 of a vertically disposed spindle 43. A sleeve section 44 is rigidly carried by a pair of brackets 45 which are welded to the member 13 so as to position the axis of the sleeve in a substantially vertical direction. The wheel spindle 43 is disposed for both vertical sliding movement and for rocking or swinging movement about the vertical axis of the sleeve 44. Like the spindle 26, the spindle 43 swingably carries a cap member 46 adjacent its upper end to rotatably support therein a downwardly disposed threaded adjusting member 47. A plurality of bearings 48 are carried by the member 13 along the axial length thereof to rotatably support therein a rock shaft 49 which in the present embodiment extends horizontally along the entire axial length of the member 13. A rock arm 50 is attached to the rearward end of the rock shaft 49 by welding or the like. The rock arm 50 pivotally carries adjacent its end a suitable threaded element 51 which threadedly receives therein the threaded portion of the adjusting member 47.

As shown in Figs. 4 and 5, the forward end of the member 13 is supported on a front land wheel 52 and which, like wheel 41, is journaled on a portion 53 of a vertically disposed spindle 54. A sleeve 55, similar to sleeve 44, is rigidly carried by a bracket 56 which is fixed to the member 13 so as to position the sleeve 55 in a vertical direction upon member 13. The spindle 54 is disposed in the sleeve 55 for both vertical sliding movement and for rocking or swinging movement about a vertical axis. The spindle 54 also has mounted adjacent its upper end a swingable cap 57 which rotatably supports therein adjacent the spindle 54 a downwardly disposed threaded adjusting member 58 which is prevented from moving axially with respect to the cap 57 while being rotatably supported therein. The forward end of the rock shaft 49 has fixed thereto a rock arm 59 which pivotally carries adjacent its end a threaded nut 60 which threadedly receives therein the threaded portion of the adjusting member 58.

The hitch construction is indicated in its entirety by the number 61 and comprises a draft beam 62 which has welded to its opposite ends suitable brackets 63 which in turn are rigidly secured to the diagonal frame member 12 by bolts 64 or the like. The draft beam 62 is preferably shaped as shown in Figs. 1 and 6 and has a forwardly disposed portion 65 which is positioned substantially transversely to the direction of movement of the tiller when the same is in operation. Suitably spaced supports 66 depend from the portion 65 of the draft beam 62 and suitable clevises 67 are swingably connected to the support 66 as by horizontally disposed bolts 68. A draft bar 69 is carried by the clevises 67 and is pivotally connected thereto by suitable pivot bolts 70, the draft bar 69 having formed therein a plurality of spaced draft beam receiving openings 71. A drawbar 72 has formed therein, adjacent its rearward end, a plurality of draft beam receiving openings 73 and a bracket 74 is pivotally connected to the drawbar 72 at one end thereof and at the other end is spaced sufficiently from the drawbar to receive the draft bar 69. The member 74 is suitably apertured so that a draft pin 75 can be received by the member 74, the bar 69, and the drawbar 72. It will be appreciated that the drawbar 72 is capable of being draft-connected to the bar 69 in any one of a plurality of positions determined by the openings 71, and the drawbar 72 is also capable of being draft connected to the bar 69 in a plurality of longitudinally disposed positions as determined by the openings 73. The drawbar 72 is braced in its forwardly extending position by means of an adjustable link 76 which is pivotally connected to the drawbar 72 as by bolt 78 and to a downwardly depending bracket 77 of the frame member 12.

The adjustable link 76 is preferably formed of apertured upper and lower straps bolted together in various axially extending positions. An axially adjustable steering link 79 is connected at one end thereof to the drawbar 72 by a bolt 80 or the like, and, at its opposite end, by means of a swivel connector 81, to one end of a rock arm 82 which is preferably welded to the spindle 26 of the front furrow wheel 24. The adjustable link 79 is also preferably formed of apertured upper and lower strap members which are capable of being bolted together in various predetermined positions whereby the spindle 26 can be shifted in the sleeve 27 until the axle 25 of the wheel 24 is substantially normal to the desired direction of travel of the implement. The wheel can then be locked in this position in relation to drawbar portion 83 and will swing with the swinging of the drawbar to follow the tractor or towing vehicle. The forward end of the drawbar 72 is fixed by a bolt 83 to a forwardly and upwardly extending bracket member 84. The drawbar 72 and the bracket 84 are suitably apertured for receiving a vertically disposed draft pin 85. A drawbar hitch of a towing vehicle is adapted to be received between the member 84 and the drawbar 72 to draft-connect therebetween through the pin 85 in a manner well known in the art.

As seen in Figs. 1 and 2, for transportation of the tiller, drawbar portion 83 is temporarily removed from portion 72 and relocated, being bolted to a portion of spindle 26, whereupon it becomes a tongue connected directly with wheel 24.

As shown in Fig. 4, the spindle 54 of the front land wheel 52 has rigidly fixed thereto at the bottom a laterally extending rock arm 86. An adjustable link 87 is connected to the end of the rock arm 86 by means of a swivel connector 88, and to the bracket 15 by a swivel connector 89. The link 87 is preferably a turn buckle and comprises threaded members 90 and 91 and a turn buckle interconnecting section 92, whereby the operator, by turning section 92 in one direction or the other, can lengthen or shorten the link 87 sufficiently to position the axis of wheel 52 substantially normal to the desired direction of travel of the implement.

In connection with wheel 24, wheel 52, thus fixed will dictate the direction of travel of the implement, that is to say parallel to the main frame, or parallel to the auxiliary frame, as will be apparent from Figs. 2, 4, and 6.

The spindle 43 of the rear furrow wheel 41 also has rigidly fixed thereto a laterally extending rock arm 93 which is chain connected to the bracket 14 by means of a chain 94. It will be appreciated that the chain is so positioned as to allow the rear furrow wheel 41 to caster in a direction away from the wall of the last furrow being formed. However, the chain is drawn taut when the rear furrow wheel is in its proper thrust receiving relationship with respect to the wall of the last furrow being formed, the rear furrow wheel thereby being prevented from turning in a direction wherein the same would have a tendency to roll up and over the wall of the last furrow. The latter wheel is therefore free to conform to the direction of travel dictated by the other two wheels.

Referring again to the power responsive lifting mechanism 40, as shown in Figs. 5, 6, and 7, it comprises a lever 95 which is fulcrumed, by means of a pivot bolt 96, to the frame member 12 for side to side swinging movement. A standard 97 is welded to the frame member 12 and provides an anchor for one end of a hydraulic cylinder 98 which is pivotally connected to the anchor standard 97 by means of a pin 99 of any suitable or well-known construction. The hydraulic cylinder 98 is preferably formed of any conventional type of construction and comprises in the present instance a cylindrical portion 100 which slidably receives a piston rod 101. The inner end of the piston rod 101 is provided with a conventional piston, not shown, which is caused to be moved axially within the cylindrical portion 100 by fluid pressure delivered therein by means of conduits 102 and 103. It should be understood that the conduits 102 and 103 extend to the tractor where they are attached to a fluid power supply and convenient to the operator.

One end of the rod 101 is in the form of a clevis and receives therein an end of the lever 95 with a pin 104 of any suitable or well-known construction interconnecting the lever to the clevis. A member 105 in the form of a bell crank, is swingably connected to the anchor 97 for side to side swinging movement by means of a pivot bolt 106 and the swingable member 105 is link-connected to the lever 95 adjacent pin 104 by means of a link 107. The other end of the swingable member 105 is link-connected to the lower end of the rock arm 39 by means of a link 108. With this construction, the rock shaft 36 will be caused to rock in a lifting direction for vertically shifting that portion of the frame 12 relative to the front furrow wheel 24 when the hydraulic cylinder 98 is actuated sufficiently to cause the lever 95 to swing a predetermined distance in its lifting direction. The interconnecting link 107 is placed in tension and causes the member 105 to also swing in its lifting direction which in turn places the interconnecting link 108 in tension and causes the rock arm 39 to swing in its lifting direction. This is the position shown in Fig. 5 which lowers the wheels and thereby raises the discs 10.

As shown in Figs. 1, 3, and 4, the pivot pin 17 which interconnects the frame member 13 to the frame member 12 extends a predetermined distance vertically beyond the bracket 14 and a bell crank 109 is rotatably received on that vertically extending portion of the pin 17. The bell crank 109 has a rearwardly extending rock arm 110 and a vertically spaced rearwardly extending rock arm 111. The elongated rock shaft 49 is provided, substantially midway between its ends, with an upwardly extending rock arm 112 which is link-connected to the rock arm 111 by means of a suitable interconnecting link 113 constituting a flexible connection between the bell crank on the main frame and the rock shaft on the relatively adjustable auxiliary frame 13. The rock shaft 49 is caused to rock in a lifting direction in response to rocking of the bell crank 109 about the axis of pin 17 as will be more fully explained presently. The rock arm 110 is link-connected to the end of the lever 95 by means of a suitable link 114 which is pivotally connected therebetween.

As previously suggested, the lever 95 is caused to swing in a lifting direction when the hydraulic cylinder 98 is actuated so as to project the piston rod 101. The swingable member 105 is caused to swing in a lifting direction by the inter-connecting link 107, the rock shaft 36 being caused to rock in a lifting direction by inter-connecting link 108. The member 12, and its associated disc gangs adjacent the front furrow wheel 24, is caused to move vertically, relative to the wheel 24, into its raised or transport position. Also, as previously suggested, the lever 95 is inter-connected to the rock arm 110 of the bell crank 109 by the inter-connecting link 114 so that the link 114 is placed in tension when the lever 95 is swung in a lifting direction. The lever 114 rocks the bell crank 109 in a lifting direction which causes, by reason of the link 113 inter-connecting the rock arm 112 to the rock arm 111, the rock shaft 49 to rock in a lifting direction. Then the sleeves 44 and 55 of Figs. 1 and 2 are caused to be shifted vertically on the spindles 43 and 54, respectively, thereby effecting vertical movement of the horizontal member 13 and, correspondingly, the member 12. The elements making up the power responsive lifting linkage 40 are so proportioned that the frame member 12 and the fore-and-aft extending frame member 13 are caused to move upwardly, upon the hydraulic cylinder's being actuated to a maximum distance sufficient to raise the disc gangs 10 above the surface of the ground.

It will be noted that each of the threaded adjusting members 33, 47, and 58 is provided adjacent it upper end with a crossbar or turning handle 115. The operator, by manually turning each of the adjusting members 33, 47, and 58 by means of their cranks 115 is able to cause the responsive sleeves 27, 44, and 55 to shift axially on their associated spindles 26, 43, and 54. The associated threaded nuts 38, 51, and 60 are held in a predetermined angular position by reason of the lifting mechanism 40. It will be appreciated, therefore, that the operator, by manually adjusting members 33, 47, and 58, is able to axially shift sleeves 27, 44, and 55 on their associated spindles 26, 43, and 54 so that the disc gangs 10, upon the hydraulic cylinder 98 being actuated so as to assume its maximum retracted position, as shown in Figs. 6 and 7, will be lowered to dig into the soil to the desired depth. With the implement set so that tools dig into the soil to their maximum extent, the elements making up the lifting mechanism 40 are so proportioned that the diagonally disposed frame member 12 and the fore-and-aft extending member 13 are caused, upon the hydraulic cylinder's being actuated so as to assume its maximum extended or lengthened position, to move vertically a distance sufficient to lift all of the disc gangs 10 out of the ground. If the operator wishes to till the ground to a depth of only a few inches while still using the hydraulic cylinder 98 in its maximum retracted position so that he is assured at all times of lowering the disc gangs 10 to a predetermined position, he has only to axially shift the sleeves 27, 44, and 55 upwardly on their spindles 26, 43, and 54 until the disc gangs 10 are moved into a predetermined cutting relationship with respect to the ground. It will be appreciated, therefore, that when the hydraulic cylinder is actuated so as to assume its maximum extended or lengthened position, the disc gangs 10 will be elevated into their transport position a distance greater than the transport position of the disc gangs when the implement is set to dig considerably deeper. The difference between the elevations of the disc gangs and their transport position is equal to the difference in depth that the disc gangs are set to dig into the soil.

A tension coil spring 116 is anchored between each of the cap members 32, 46, and 57 and their associated sleeve members 27, 44, and 55 for assisting in moving the implement from its operating position to its transport position. Also, as shown in Fig. 5, a link 117 is pivotally anchored on the member 97 by a pin 118 to be removably connected to an end of the bar 95 by a bolt 119 and thereby secure the entire power mechanism 40 in an extended position. This locks the mechanism in the transport position so that cylinder 98 is relieved of stress and may be readily removed for use on another implement, not shown, as is common. Fig. 7 shows the link 117 released from the bar 95.

From the foregoing, it should be understood that this invention permits vertical adjustment of the discs with respect to the ground. Thus, in addition to the power cylinder actuating the discs up and down, the adjustable screws also actuate the discs up and down. In Fig. 4, the screw 58 is in a raised position so that rotation of the shaft 49 will lower the wheel 52 and raise the discs 10 off the ground. Since the screw is in a raised position, the wheel is also raised and the discs penetrate the ground a maximum amount. Fig. 5 shows the screw 33 to be in a lowered position and the power mechanism positioned to place the discs above the ground. With this combination, actuation of the power mechanism will place the discs in a position to where they only slightly penetrate the ground.

While a specific embodiment of this invention has been shown and described, the scope thereof should be limited only by the appended claims.

I claim:

1. In a disc tiller comprising a frame including a diagonally disposed member and a generally fore-and-aft extending member, a substantially vertical pivot connecting said diagonally disposed member, adjacent its rearward end to the central portion of said fore-and-aft extending member, a plurality of discs mounted on said diagonally disposed member to depend therefrom, a vertically shiftable front furrow wheel supported adjacent the forward end of said diagonally disposed member, a vertically shiftable front land wheel supported adjacent the forward end of said fore-and-aft extending member, and a vertically shiftable rear furrow wheel supported adjacent the rearward end of said fore-and-aft extending member, power operated means for vertically shifting said wheels from an operative to an inoperative position including a rock shaft rotatably carried by said fore-and-aft extending member and connected to said land wheel and to said rear furrow wheel for effecting vertical shifting of said front land and rear furrow wheels relative to said fore-and-aft extending member upon said rock shaft's being rocked in one direction, a bell crank fulcrumed on said pivot, said bell crank having a pair of rock arms one of said rock arms being connected with said rock shaft, a lever fulcrumed on said diagonal member for back-and-forth swinging movement, a hydraulic motor anchored with said diagonal member and connected to one end of said lever for swinging said lever upon said motor's being actuated, a link interconnecting the other end of said lever with the other of said rock arms for rocking said bell crank and said rock shaft upon said lever's being swung by said hydraulic motor, and connecting means between said front furrow wheel and said lever for vertically shifting said front furrow wheel relative to said diagonal member upon said motor's being actuated whereby said wheels are caused to shift vertically in unison.

2. In a disc tiller having a frame including a diagonally disposed member and a generally fore-and-aft extending member, a substantially vertical pivot connecting said diagonally disposed member at its rearward end to said fore-and-aft extending member substantially mid-way of the length thereof for angular adjustment of the working position of said diagonal member relatively to said fore-and-aft extending member, a vertically shiftable front furrow wheel supported at the forward end of said diagonally disposed member, a vertically shiftable front land wheel supported at the forward end of said fore-and-aft extending member, a vertically shiftable rear furrow wheel supported at the rear end of said fore-and-aft member, a rock shaft rotatably carried by said fore-and-aft extending member, connecting means from said rock shaft to said front land wheel and to said rear furrow wheel for vertically shifting said front land and rear furrow wheels in unison when said rock shaft is rotated, a bell crank fulcrumed on said pivot, said bell crank having a pair of rock arms one of said rock arms being connected with said rock shaft, a lever fulcrumed on said diagonal member for back-and-forth swinging movement, a hydraulic motor anchored with said diagonal member and conected to one end of said lever for swinging said lever upon said motor's being actuated, a link means interconnecting the other end of said lever with the other of said rock arms for rocking said bell crank and said rock shaft upon said lever's being swung by said hydraulic motor, regardless of the relative angular adjustment of said diagonal and said fore-and-aft members.

References Cited in the file of this patent
UNITED STATES PATENTS

| | | |
|---|---|---|
| 1,928,952 | Silver | Oct. 3, 1933 |
| 2,562,747 | Silver | July 31, 1951 |
| 2,669,818 | Pursche | Feb. 23, 1954 |